United States Patent [19]

Jones et al.

[11] 4,077,827

[45] Mar. 7, 1978

[54] APPARATUS FOR PRODUCING A ROLL OF PHOTOGRAPHIC FILM PRINTS HAVING ADHESIVE TRANSFER TAPE BACKING

[76] Inventors: Herman L. Jones, 7302 - 84th St., NE., Marysville, Wash. 98720; John H. Haugen, 9925 Davies Rd., Lake Stevens, Wash. 98258

[21] Appl. No.: 538,544

[22] Filed: Jan. 6, 1975

[51] Int. Cl.[2] .......................... B32B 31/00; B31F 5/00

[52] U.S. Cl. ...................................... 156/352; 156/554

[58] Field of Search ............... 156/324, 554, 555, 352, 156/361, 368, 192, 459

[56] References Cited

U.S. PATENT DOCUMENTS

| | | | |
|---|---|---|---|
| 2,248,744 | 7/1941 | Cohen | 156/353 |
| 2,916,078 | 12/1959 | Hebert | 156/554 |
| 2,980,159 | 4/1961 | Greene | 156/554 |
| 3,728,199 | 4/1973 | Stanley | 156/554 |
| 3,756,896 | 9/1973 | Kono | 156/554 |

*Primary Examiner*—Douglas J. Drummond

[57] ABSTRACT

An adhesive tape applicator includes one or more tape dispensing units, of which each dispenses a continuous strip of pressure-sensitive adhesive tape which is applied progressively to the back of a continuous strip of developed photographic film prints such that it does not become detached from the back of the print strip when the two are wound spirally into a roll. This roll thereafter can be unwound and severed, using conventional paper cutters, into individual prints with adhesive tape backing. The tape backing includes a cover ply which when peeled off leaves the strip adhesive exposed for mounting the print.

11 Claims, 4 Drawing Figures

FIG. 1
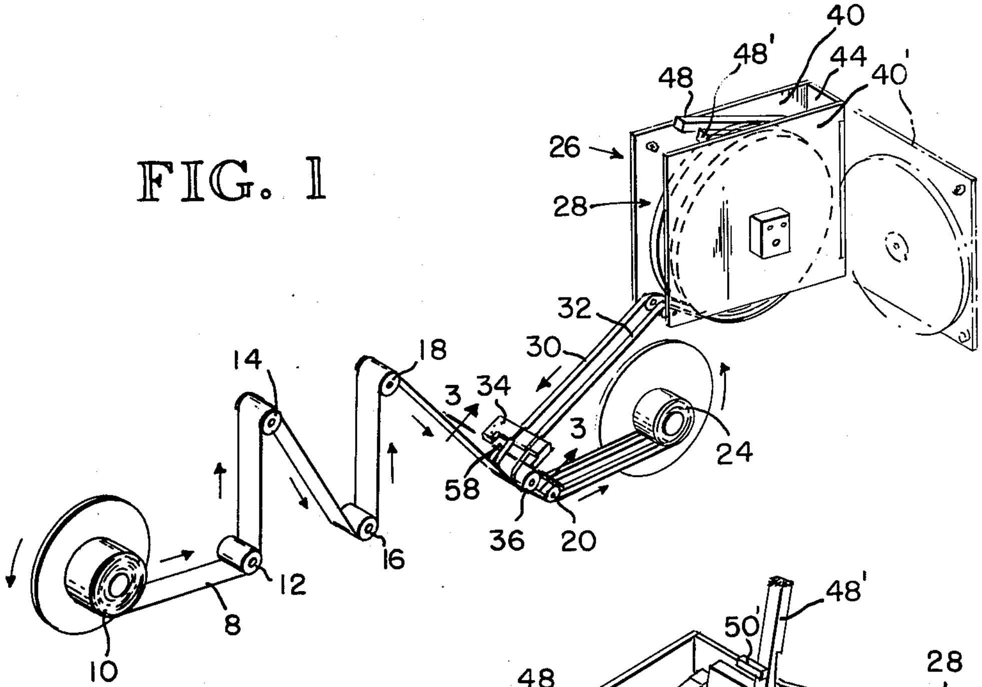
FIG. 2
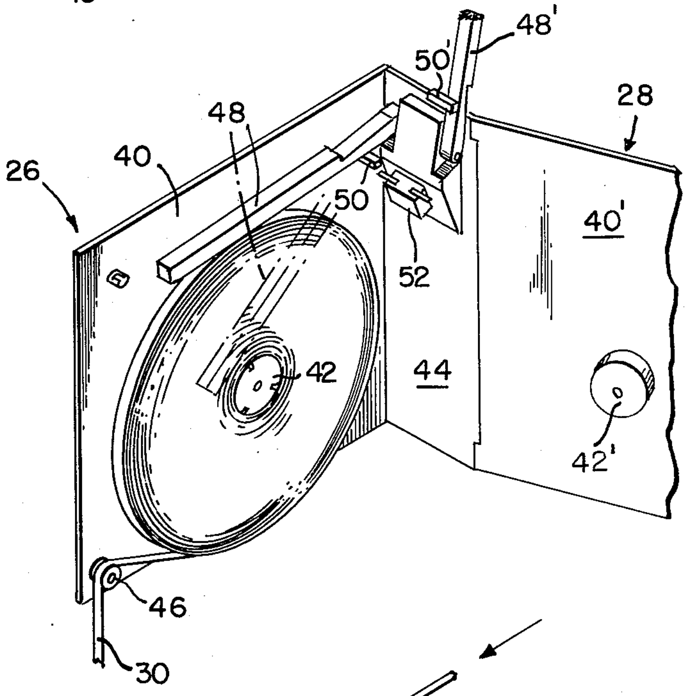
FIG. 3
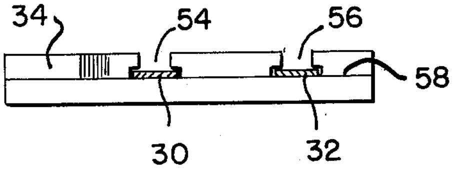
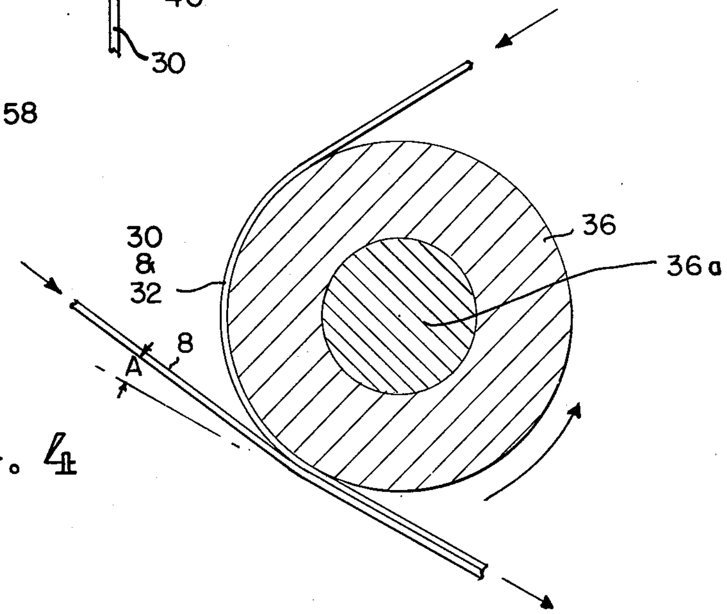
FIG. 4

APPARATUS FOR PRODUCING A ROLL OF PHOTOGRAPHIC FILM PRINTS HAVING ADHESIVE TRANSFER TAPE BACKING

BACKGROUND OF THE INVENTION

Commercial photographic print developers have heretofore produced individual photographic prints by first developing and printing several customer's roll film on long continuous strips of photosensitive paper. These strips are then fed through a paper cutter for cutting into individual prints. It has become desirable from the customer's point of view to be able to mount photographic prints without use of external aids such as corner tabs or the messiness of liquid cement. Until the present invention, however, commercial mass production processing of roll film into prints has not permitted the commercial film developer to offer the customer a better means of mounting photographic prints.

SUMMARY OF THE INVENTION

The present invention enables the commercial film developer to automatically apply one or more continuous strips of pressure-sensitive adhesive tape to the back of a continuous strip of photographic prints, which, upon severance into individual photographic prints, yield prints with adhesive tape backing. The tape includes a cover ply which, when peeled off, leaves strip adhesive adhered to the print and exposed for mounting. Thus, the customer may now mount photographic prints without any inconvenience.

The present invention permits the application of a continuous strip of pressure-sensitive adhesive tape to the back of a continuous strip of photographic prints such that the joined tape and print strips can be wound spirally into a roll without danger of the tape strip becoming detached from the print strip. This roll thereafter may be stored, shipped, etc., until being unwound and cut into individual prints, using conventional paper cutters, at the convenience of the developer.

BRIEF DESCRIPTION OF THE DRAWINGS

FIG. 1 is a perspective view of the adhesive tape applicator according to the present invention as applied to a typical photographic print strip conveyor system.

FIG. 2 is a perspective view of the tape dispensing units of the adhesive tape applicator of FIG. 1;

FIG. 3 is a cross section taken along lines 3—3 in FIG. 1;

FIG. 4 is a side elevation partly in section on expanded scale of the tape applicator roller of the adhesive tape applicator of FIG. 1.

DETAILED DESCRIPTION OF THE PREFERRED EMBODIMENT

The adhesive tape applicator of FIG. 1 is suitable for use in applying one or more continuous strips of pressure-sensitive adhesive tape to the back of a continuous strip of developed photographic prints. Upon application to the print strip, the tape strip or strips are spaced apart in face-to-face registry with the back of the print strip and extend the length of the print strip parallel to the longitudinal edges thereof, as illustrated in the lower horizontal run, FIG. 1 right hand side. The adhesively joined tape and print strips thereafter are wound spirally into a roll. A conventional paper cutter may then be used to progressively unwind this roll and sever each print from the continuous strip of photographic prints to yield individual prints with adhesive tape backing.

The tape applicator of this invention may be used with conventional photographic developing, printing or conveying equipment in which the print strip ultimately is wound spirally into a roll, or it may be used independently of such equipment. The print strip 8 is progressively unwound from a supply roll 10, trained over and under a series of intermediate guide rollers 12, 14, 16, 18 and 20, and rewound onto a take-up roll 24, as indicated by arrows. The adhesive tape strip(s) are applied progressively to the back of the print strip 8 at a tape application station adjacent the downwardly inclined print strip run between guide rollers 18 and 20.

Adhesive tape suitable for use in this invention is pressure-sensitive adhesive transfer tape manufactured by Minnesota Mining & Manufacturing Company. It comprises a thin, silicone treated cover ply upon one side of which is deposited a layer of pressure-sensitive adhesive. Following pressure application of the tape to a substrate such as the back of strip of photographic paper, the cover ply can be peeled off leaving strip adhesive adhered to the substrate and exposed.

The adhesive tape applicator of this invention comprises left and right tape dispensing units 26 and 28 which respectively mount two rolls of pressure-sensitive adhesive transfer tape and which dispense simultaneously two spaced apart, parallel, continuous adhesive tape strips 30 and 32. The strips pass through a recessed guide bar 34 which positions them tangentially adjacent the outer curved surface of an applicator roller 36 such that they are spaced apart and parallel to each other. The tape strips 30 and 32 are maintained under slight tension as they are wrapped partially about the applicator roller 36 to be held with their cover plys in face-to-face engagement with the outer curved surface of the applicator roller 36 and their adhesive sides facing radially outwardly. The print strip 8 is trained underneath the applicator roller 36 with its back facing the applicator roller 36 such that the tape strips are engaged between the outer surface of the applicator roller and the back of the print strip. As the applicator roller 36 rotates on hub **36*a* (FIG. 4) in a counterclockwise direction about its longitudinal axis, conjointly with movement of the print strip 8, the tape strips 30 and 32 are pulled from their dispensing units and are simultaneously drawn concentrically about the applicator roller 36 into face-to-face adhesive engagement with the back of the print strip 8. Thereafter, the print strip 8 with the tape strips 30 and 32 adhesively secured in face-to-face registry with the back thereof is drawn underneath the final guide roller 20 and spirally wound onto the take-up roll 24 by electrical winding means not shown. In the example, the adhesively joined tape and print strips are wound spirally onto the take-up roll 24 with the back of the print strip facing radially inwardly such that each convolution of the take-up roll 24 includes a portion of the print strip disposed radially outwardly from the portions of the tape strips 30 and 32** adhered thereto. The number of tape dispensing units and accordingly the number of tape strips, of course, may be varied, if desired.

As most clearly shown in FIG. 2, the tape dispensing units are generally similar. The left tape dispensing unit 26 is described herein with reference numerals. Like parts of the right tape dispensing unit 28 are designated with the same reference numerals primed. A roll of the above-described adhesive transfer tape is supported on a rotatable hub 42 adjacent the inside surface of a left mounting plate 40. The left and right mounting plates 40 and 40' are pivotally connected with the vertical edges of a vertical support plate 44 to swing horizontally between an open position depicted in broken lines in FIG. 1, in which they avert from one another, and a closed position depicted in solid lines in FIG. 1, in which they are adjacent and oppose each other. In the mounting plate open position, the tape rolls are exposed for reloading.

As the left tape strip 30 is progressively unwound from its tape roll, it is trained over a lower roller 46 projecting inwardly from the rear lower corner of the left mounting plate 40. An arm 48 is pivotally supported at its forward end from the upper edge portion of the vertical support plate 44 to swing vertically between a retracted raised position (right arm 48' depicted in its retracted position in FIG. 2) and an operative lowered position in which it slidably engages the outer surface of the left tape roll. The left and right arms 48 and 48' impose drag on the tape rolls to maintain slight tension on the dispensed tape strips.

The left arm 48 includes an elongated limit stop 50 projecting transversely inwardly from the forward portion of the arm to be engageable with the upper edge of the support plate 44 when the arm is in its retracted position. The arm also includes a notch at its forward end which engages the upper edge of the support plate in the retracted position of the arm. As the tape roll is progressively unwound and becomes smaller in radius, the arm 48 correspondingly swings downwardly until reaching its lower position depicted in broken lines in FIG. 2. An electrical limit switch 52 mounted on the vertical support plate is engaged and closed by the left arm limit stop 50 when the arm reaches its lower position. This switch is electrically connected with electrical control means not shown for actuating and deactuating the take-up roll winding means. Thus, movement of the print strip 8 is terminated when one or both tape rolls are exhausted.

As most clearly shown in FIG. 3, the guide plate includes two spaced-apart, parallel, generally U-shaped grooves 54 and 56 through which the tape strips 30 and 32 pass on their way from the tape dispensing units to the tape strip applicator roller 36. The guide plate grooves terminate at their lower ends in mutually opposed channels adapted to receive the longitudinal edge portions of the tape strips so as to maintain the tape strips in a substantially flattened configurations coinciding with a single plane. The guide plate is supported at one end by means not shown with the grooves 54 and 56 inclined toward and terminating adjacent the upper edge of the applicator roller 36. As the tape strips 30 and 32 emerge from the lower ends of the guide plate channels 54 and 56, they pass over a flat guide surface 58 (FIG. 1) and are tangentially engaged with the outer surface of the applicator roller along an inclined direction substantially perpendicular to the axis of rotation of the applicator roller.

Referring now in particular to FIG. 4, as the photographic print strip 8 is directed in a downwardly inclined direction between guide rollers 18 and 20 (FIG. 1) to pass through the tape application station, it is diverted by the applicator roller 36 from a single straight run into two inclined runs: a first run between the upper guide roller 18 and the applicator roller, and a second run between the applicator roller and the lower guide roller 20. The direction of the first run is inclined at an angle A to the direction of the second run. As will be appreciated, this diversion of the print strip 8 from a single run imparts tension to the print strip 8 which tends to draw it firmly against the tape strips 30 and 32 as they are trained about and drawn underneath the applicator roller 36. This diversion also causes the two tape strips to engage and be secured to the print strip 8 while the print strip is curved about the applicator roller.

Inasmuch as the photographic print and tape strips are superimposed radially as they are drawn together and adhesively interengaged during passage underneath the applicator roller 36, the adhesively interengaged tape and print strip portions are of different lengths due to their different radii: the tape strip portions being of shorter length than the print strip portions. Thus, when the adhesively interengaged tape and print strips are rewound spirally in a counterclockwise direction onto the take-up roll 24 with the back of the print strip facing inwardly, as shown (FIG. 1), the tape strips do not tend to become detached or peel away from the back of the print strip. By positioning the applicator roller 36 so as to increase or decrease the angle A, the length differential between the interengaged print and tape strip portions is correspondingly increased and decreased, as desired, depending upon the curvature of the outer surface of the applicator roller. Thus, it is possible, by controlling the angle A for an applicator roller of given diameter, to use this invention with take-up rolls of differing inner or outer diameters. The angle A should be selected, depending upon the size of the take-up roll, to eliminate or minimize curling of the severed prints, or detachment of the tape strips when flattened subsequent to application to the print strip.

It is believed that, by wrapping the tape strips around a substantial portion of the outer curved surface of the applicator roller, as shown (FIG. 4), a certain degree of curved memory is produced in the tape strips. This memory further ensures that the tapes will remain secured in face-to-face registry with the back of the print strip when wound spirally into a roll.

In most practical cases, a small acute angle for the illustrated angle A is most effective. For example, most commercial film developing equipment wind the developed continuous film strip in a roll having an inner diameter of two inches. When using this invention with such equipment, an angle A of at least 1° and no more than 10°, and preferably 2° to 7° is desirable, depending upon the diameter of the applicator roller. When using the above described adhesive transfer tape, there is a tendency, depending upon the angle A and the diameter of the applicator roller, for the severed prints to curl slightly; however, in most cases, the tape cover plys do not become separated from the severed print because the adhesive layers of each tape backing allows the print to flatten out by moving relative to the tape cover ply along the length of the severed print. This relative movement, however, does not take place over the much longer distances which constitute the tape and print strips prior to severance into individual prints.

While the preferred embodiment of the invention has been illustrated and described herein, it should be understood that variations will become apparent to one skilled in the art. For example, a stationary curved plate or the like which is positioned to direct the print strip from a straight run may be used in place of the applicator roller 36. Accordingly, the invention is not to be illustrated to the specific embodiment illustrated and described herein and the true spirit and scope of the invention is to be determined by reference to the appended claims.

What is claimed is:

1. Apparatus for producing a roll of photographic film prints having adhesive transfer tape backing composed of a transferable pressure sensitive adhesive layer and a releasable backing strip, the apparatus comprising: tape dispensing means for dispensing a continuous strip of adhesive transfer tape conjointly with movement of a continuous strip of photographic film prints along a run, guide means for directing the tape strip toward the run in a course of travel along which the tape strip is confined and guided, applicator means adjacent the run for receiving the tape strip from said guide means and progressively applying the tape strip to the back of the print strip as the print strip is drawn along the run, and take-up means for simultaneously winding the tape and print strips into a roll, said applicator means providing a curved surface about which the tape and print strips can be curved simultaneously in a direction corresponding to the direction in which said take-up means wind the tape and print strips into a roll such that the adhesive layer is progressively applied to the back of the print strip with the backing strip in substantially face-to-face registry therewith, whereupon the tape and print strips may be wound simultaneously in said direction into a roll, said curved surface being of sufficient curvature and so positioned with respect to the run that the tape strip is curved substantially more than the print strip in said direction, whereby the adhesive layer remains secured to the back of the print strip with the backing strip in substantially face-to-face registry therewith when the tape and print strips are wound simultaneously into the roll.

2. The apparatus of claim 1 wherein said curved surface directs the print strip in a first direction relatively away from the run, and then directs the print strip in a second direction relatively toward the run, said first direction being inclined to said second direction a small acute angle.

3. The apparatus of claim 2 wherein said angle is about 1° to 10°.

4. The apparatus of claim 2 wherein said angle is about 2° to 7°.

5. The apparatus of claim 1 wherein said curved surface is generally cylindrical, and wherein the tape strip is curved about a substantial portion of said cylindrical surface, and intervenes between the back of the print strip and said cylindrical surface, the print strip being curved about a minor portion of said cylindrical surface, the curved portion of the print strip having a length related to the diameter of the roll such that the tape strip will not become detached from the back of the print strip when the two strips are wound simultaneously into the roll.

6. The apparatus of claim 1, wherein said applicator means comprises a roller.

7. The apparatus of claim 1 wherein said tape dispensing means further comprises means for maintaining the tape strip in a substantially flattened configuration, and for tangentially positioning the tape strip against said curved surface.

8. The apparatus of claim 7 wherein said dispensing means further comprises means rotatively supporting the tape strip in roll form, an arm engaging the outer surface of the tape roll to induce tension in the tape strip as it is unwound progressively from the roll, said arm being pivotally movable to swing to and from a first position in which the tape strip is completely unwound, and means engaged by said arm at said first position for causing termination of movement of the print strip.

9. In a system for conveying a continuous strip of photographic film print, the system including a supply roll from which the print strip is unwound progressively, a powered take-up roll onto which the print strip is wound progressively, and means for directing the print strip along a run as it is drawn from the supply roll to the take-up roll, the improvement comprising:

tape dispensing means including means for dispensing a continuous strip of adhesive transfer tape composed of a transferable pressure sensitive adhesive layer and a releasable backing strip conjointly with movement of the print strip along the run, and guide means for directing the tape strip toward said run in a course of travel along which the tape strip is confined and guided;

applicator means adjacent the run for receiving the tape strip from said guide means and progressively applying the tape strip to the back of the print strip as the print strip is drawn along the run, said applicator means providing a curved surface about which the tape and print strips are curved simultaneously in a direction corresponding to the direction in which the take-up roll winds the tape and print strips into a roll such that the adhesive layer is progressively applied to the back of the print strip with the backing strip in substantially face-to-face registry therewith as the two strips are drawn simultaneously about said curved surface, whereupon the tape and prints strips may be wound simultaneously in said direction into a roll by the take-up roll, said curved surface being of sufficient curvature and so positioned with respect to said run that the tape strip is curved substantially more than the print strip in a direction corresponding to said direction, whereby the adhesive layer remains secured to the back of the print strip with the backing strip in substantially face-to-face registry therewith when the tape and print strips are wound simultaneously onto the take-up roll.

10. The system of claim 9 wherein said applicator means comprises a roller.

11. Apparatus for producing a roll of photographic film prints having adhesive transfer tape backing composed of a transferable pressure sensitive adhesive layer and a releasable backing strip, the apparatus comprising: means providing a curved surface about which a continuous strip of photographic film prints can be curved, guide means for directing a continuous strip of adhesive transfer tape toward said curved surface in a course of travel along which the tape strip is confined and guided, and positioning the tape strip so that the adhesive layer may engage the back of the print strip with the backing strip in face-to-face registry therewith as the tape and print strips are curved simultaneously about said curved surface, and take-up means for simultaneously winding the tape and print strips into a roll in a direction corresponding to the direction in which the tape and print strips are curved about said curved surface, said curved surface being of sufficient curvature and so positioned with respect to the direction of travel of the print strip that the tape strip is curved substantially more than the print strip in said direction, whereby the adhesive layer remains secured to the back of the print strip with the backing strip in substantially face-to-face registry therewith when the tape and print strips are wound simultaneously into a single roll.

* * * * *